United States Patent Office 3,557,057
Patented Jan. 19, 1971

3,557,057
2,4-DINONYLPHENOLS AS IMPROVED ANTIOXIDANTS FOR RUBBER
Earl Kaplan, Metuchen, N.J., assignor to American Cyanamid Company, Stamford, Conn., a corporation of Maine
No Drawing. Continuation-in-part of application Ser. No. 566,251, July 19, 1966. This application July 9, 1969, Ser. No. 840,514
Int. Cl. C08f 45/58
U.S. Cl. 260—45.95    3 Claims

ABSTRACT OF THE DISCLOSURE

Diene-containing vulcanizable natural or synthetic rubbers stabilized against oxidative deterioration by addition of 0.1–5% of a branched chain 2,4-dinonylphenol such as prepared by the reaction of propylene trimer and phenol.

---

This application is a continuation-in-part of application Ser. No. 566,251 filed July 19, 1966.

This invention relates to diene-containing, vulcanizable, natural and synthetic rubbers stabilized against oxidative deterioration with 2,4-dinonylphenol wherein the nonyl groups are branched chain.

Although dialkylated phenols are known as antioxidants for rubber, much effort has been expended on improving their effectiveness as antioxidants as well as on reducing damaging side effects due to introduction of the antioxidants such as staining and discoloration. In addition, given good antioxidant activity and reduced tendency to stain or discolor, the rubber industry gives preference to those antioxidants which are simple in composition and relatively inexpensive to manufacture.

Attempts to improve the alkylphenols as antioxidants have involved formulating them in admixture with various other antioxidant agents in order to obtain synergistic combinations. This benefit, however, is complicated by the introduction of mixtures of ingredients and evidences prior failure at finding a simple material which is effective when used alone.

Other attempts have involved the synthesis of condensation products of various alkyl phenols with aldehydes, such as formaldehyde, benzaldehyde, crotonaldehyde and the like. While some of these condensation products do, in fact, demonstrate somewhat better antioxidant capacity than the simple alkyl phenols, this improvement is offset by the inclusion of certain deleterious properties in the condensation products such as color deficiencies, a tendency to discolor and to stain rubber, high cost and consequent limited availability of the product due to the more complex manufacturing procedure.

Substantial need therefore exists for antioxidants for rubber which (1) are readily available and low in cost, (2) have a high level of antioxidant effectiveness in an uncombined state, (3) are free from side effects such as tendency to discolor and to stain rubber, and (4) which provide oxidative stability to diene-containing vulcanizable natural and synthetic rubbers generally and it is an object of this invention to provide a rubber antioxidant composition satisfying these requirements.

It has now been discovered that branched chain 2,4-dinonylphenols show unexpected superiority as antioxidants for vulcanizable, diene-containing, natural and synthetic rubbers and fulfill the other requirements described above. From about 0.1 to about 5% by weight of the rubber stock, preferably from about 0.25% to about 2.5%, will be effective. The 2,4-dinonylphenols may be incorporated into rubber stocks alone or in admixture with the usual rubber additives such as vulcanizing agents, reinforcing agents, lubricants, plasticizers, accelerators, and the like, by normal milling procedures. The compounded stocks are then vulcanized according to conventional practices and, where necessary, postcured. The vulcanizates obtained by this procedure are protected against deterioration by oxidation for extended time periods and are useful in the fabrication of articles such as gaskets, diaphragms, weatherstripping and tires using standard fabricating techniques.

The 2,4-dinonylphenols of the invention are known compounds and are prepared by any of a variety of standard syntheses. A preferred procedure is the dialkylation of phenol by propylene trimer as described in U.S. Pat. 3,000,964. The process of this patent results in a dinonylphenol mixture predominating in 2,4-dinonylphenols differing in the character of the branching of the nonyl groups. The branching is believed to be mainly tertiary.

The rubbers which are protected by the dinonylphenols of the invention are those vulcanizable, diene-containing, natural and synthetic rubber stocks subject to oxidative deterioration. Typical examples of suitable vulcanizable synthetic rubbers are polychloroprene; polyisoprene; polybutadiene; butyl rubber (a polymerization production of a major portion of a monoolefin such as isobutylene and a minor portion of a poly-olefin such as butadiene or isoprene); the rubbery copolymers of butadiene and styrene (which contain from about 50 to about 75% by weight of butadiene); the rubbery copolymers of butadiene and acrylonitrile; and ethylene propylene diene-modified rubbers of the types disclosed in a technical report published by E. I. du Pont de Nemours and Company entitled "Nordel Hydrocarbon Rubber" (April 1964). Amberg discloses other suitable ethylene-propylene-diene terpolymers in "Vulcanization of Elastomers" (Alliger and Sjothum ed. 1963). The ethylene-propylene-diene terpolymers described in "Ethylene Propylene Rubbers," J. Institute of Rubber Industry, October 1968, pages 228–232, are also contemplated by this invention. Usually, the terpolymer contains up to about 10 mole percent diene. Preferred dienes are 1,4-hexadiene, dicyclopentadiene, 5-methylene-2-norbornene, methyl tetrahydroindene and 5-ethylidene-2-norbornene but others including 11-ethyl-1,11-tridecadiene, cyclooctadiene and the like can be used.

The invention is more fully illustrated by the examples which follow. The parts indicated are parts by weight unless otherwise noted. The embodiment set forth is purely for specificity and, of course, should not be construed as limiting the inventive concept.

EXAMPLES 1–6

In order to test the antioxidant properties of the compounds of the present invention as well as those of the prior art, a basic natural rubber stock was compounded in accordance with the following formulation:

| Ingredient: | Parts |
|---|---|
| Pale crepe rubber | 100 |
| Whiting | 80 |
| Titanium dioxide | 20 |
| Zinc oxide | 5 |
| Process oil | 1 |
| Stearic acid | 0.5 |
| Anti-sun wax | 0.5 |
| Sulfur | 2.25 |
| 2-mercaptobenzothiazole | 0.5 |
| 2,2′-dithio(benzothiazole) | 0.5 |
| Tetramethylthiuramidisulfide | 0.05 |
| Antioxidant | 1.0 |

Test sheets were prepared by molding in a press at 130° C. for 20 and 30 minutes. Specimens of the test sheets were then tested for tensional creep according to the procedure described by Lichty, Spacht and Hollingshead, Industrial and Engineering Chemistry, 47, 165 (1955). The results are shown in Table I which follows.

TABLE I

| Antioxidant | | Relative creep values (percent improvement over control) | |
|---|---|---|---|
| | | 20 minute cure | 30 minute cure |
| Example: | | | |
| 1 | Dibutyl-p-cresol | 151 | 152 |
| 2 | Diocytl-p-cresol | 176 | 236 |
| 3 | Dioctylphenol | 208 | 357 |
| 4 | 2,4-dinonylphenols | 284 | 377 |
| 5 | Didodecylphenol | 261 | 355 |
| 6 | Nonyl-p-cresol | 182 | 194 |

The dinonylphenols of Example 4 are the 2,4-dialkylated reaction products of propylene trimer and phenol prepared according to U.S. Pat. 3,000,964.

These results show the unexpected peak performance of the dinonylphenols of the present invention relative to other dialkylphenols of the same general class and dialkyl cresols such as the prior art dibutyl-p-cresol, dioctyl-p-cresol, dioctylphenol, nonyl - p - cresol and didodecylphenol. The results are reported as percent improvement in creep value as compared with an untreated control sample which was rated 100. It can be readily observed that the subject dinonylphenols after a 20-minute cure are 76% more effective than dioctylphenol and 23% more effective than the didodecylphenol. This is considered to be truly unexpected in a way that makes the claimed material useful per se while its higher and lower analogs require promoters or additives to be commercially useful.

COMPARATIVE EXAMPLES 7 AND 8

Using the same formulation as indicated above the following data was also accumulated:

TABLE II

| Antioxidant | | Relative Creep Values (percent improvement over control) | |
|---|---|---|---|
| | | 20 minute cure | 30 minute cure |
| Example: | | | |
| 4 | 2,4-dinonylphenols | 284 | 377 |
| 7 | 2,2'-methylenebis-(6-nonyl)-p-cresol | 286 | 371 |
| 8 | 50-50% by weight mixture of the reaction products of 1 mol of phenol and 2 mols styrene and the reaction products of 1 mol of phenol and 2 mols of diisobutylene plus 1 mol of isobutylene (U.S. Patent 2,945,001). | | 155 |
| Control | None | 100 | 100 |

The results in Table II above show the excellent performance of the 2,4-dinonylphenols of the invention as compared with the known products of Example 7 and unexpectedly superior results over the synergistic admixture of Example 8 which is also costly and difficult to control in quality.

EXAMPLE 9

A dinonylphenol mixture predominating in the 2,4-isomer, prepared by the reaction of propylene trimer and phenol in accordance with U.S. Pat. 3,000,964 was compounded with pale crepe natural rubber and other additives (formulation A in Table III below), vulcanized, and then tested for oxidation stabilization in terms of tensile retention after aging and tensional creep.

Substantially the same formulation (B in Table III below) except for substitution of a dinonylphenol-containing product prepared according to Example 10 of U.S. Pat. 2,975,216 (except for use of nonene in place of diisobutylene), when vulcanized and tested as for formulation A, exhibited substantially poorer tensile retention after aging and tensional creep than formulation A (this invention). The difference in tensional creep becomes greater with continued exposure. These test results (Table III below) demonstrate that the highly complex antioxidant mixtures of the patent, at most containing only minor proportions of 2,4-dinonylphenol, provide substantially inferior stabilization as compared with the simple dinonylphenol composition of the invention which predominates in the 2,4-isomer.

TABLE III

| | Formulation (parts) | |
|---|---|---|
| | A | B |
| Pale crepe | 100 | |
| Calcene TM | 60 | |
| Unitane 0-220 | 20 | |
| Zinc oxide | 5 | |
| Stearic acid | 1 | |
| Sulfur | 3 | |
| MBTS | 1 | |
| Dinonyl phenol | 1 | |
| Dinonyl substituted phenol | | 1 |

| Test results | | |
|---|---|---|
| Percent tensile retention on aging: | | |
| 48 hrs. cell oven at 100° C | 32 | 28 |
| 48 hrs. oxygen bomb aging at 80° C | 86 | 80 |
| Tensional creep, 90° C.: | | |
| 22 hrs | 7.7 | 8.3 |
| 44 hrs | 13.2 | 16.2 |
| 66 hrs | 18.6 | 24.2 |

An additional benefit of use of the 2,4-dinonylphenols in accordance with the invention is discoloration and staining resistance equivalent to the commercial styrenated phenols while imparting a level of oxidation stabilization almost as high as the styrenated phenols. The 2,4-dinonylphenols of the invention, although somewhat less active than the styrenated phenols, are considerably cheaper to manufacture.

I claim:
1. A rubber composition consisting essentially of a diene-containing, vulcanizable rubber stock and from about 0.1 to 5 percent, based on the weight of the rubber stock, of the reaction product of propylene trimer and phenol.
2. The composition of claim 1 in which the rubber stock is a natural rubber.
3. A composition of claim 1 in which the rubber stock is a synthetic rubber.

References Cited

UNITED STATES PATENTS

| 2,581,907 | 1/1952 | Smith | 260—45.95 |
| 2,975,216 | 3/1961 | Spacht | 260—45.95 |
| 3,000,964 | 9/1961 | Milligan | 260—624 |
| 3,260,757 | 7/1966 | O'Shea | 260—45.95 |
| 3,387,057 | 7/1968 | Neuworth et al. | 260—45.95 |

HOSEA E. TAYLOR, Primary Examiner

U.S. Cl. X.R.

260—23.7, 28.5, 41, 45.8, 45.9, 808, 814